United States Patent
Shin et al.

(10) Patent No.: US 8,797,308 B2
(45) Date of Patent: Aug. 5, 2014

(54) METHOD OF DRIVING DISPLAY APPARATUS AND DRIVING CIRCUIT FOR DISPLAY APPARATUS USING THE SAME

(75) Inventors: Byung-Hyuk Shin, Seoul (KR); Min-Kyu Park, Asan-si (KR); Seon-Ki Kim, Anyang-si (KR); Jae-Ho Oh, Seoul (KR); Kyung-Woo Kim, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 744 days.

(21) Appl. No.: 12/356,584

(22) Filed: Jan. 21, 2009

(65) Prior Publication Data

US 2010/0039416 A1 Feb. 18, 2010

(30) Foreign Application Priority Data

Aug. 14, 2008 (KR) .......................... 10-2008-0080064

(51) Int. Cl.
*G09G 5/00* (2006.01)
(52) U.S. Cl.
USPC .......................................................... 345/208
(58) Field of Classification Search
USPC .......................................... 345/208, 204, 55
See application file for complete search history.

(56) References Cited

U.S. PATENT DOCUMENTS

| | | | | |
|---|---|---|---|---|
| 5,060,007 A | * | 10/1991 | Egawa | ............................. 396/52 |
| 7,197,075 B2 | * | 3/2007 | Akimoto et al. | ......... 375/240.16 |
| 7,764,310 B2 | * | 7/2010 | Nitta | ........................... 348/220.1 |
| 2004/0091046 A1 | | 5/2004 | Akimoto et al. | |

FOREIGN PATENT DOCUMENTS

| | | |
|---|---|---|
| CN | 1116797 | 2/1996 |
| EP | 1641276 | 9/2005 |
| JP | 2003-274282 | 9/2003 |
| JP | 3495485 | 2/2004 |
| JP | 2004-302045 | 10/2004 |
| JP | 2007-288483 | 1/2007 |
| JP | 2010-011342 | 1/2010 |

\* cited by examiner

*Primary Examiner* — William Boddie
*Assistant Examiner* — Leonid Shapiro
(74) *Attorney, Agent, or Firm* — F. Chau & Associates, LLC (57) ABSTRACT

In a driving method of a display apparatus using a driving circuit, when an image signal is a film image signal, first, second, and third original image signals are extracted based on the film image signal. Then, a first compensation image signal is generated based on first and second original image signals, and a second compensation image signal is generated based on second and third original image signals. The first original image signal, the first compensation image signal, the second original image signal, and the second compensation image signal are sequentially output to have a driving frequency higher than an input frequency. In addition, the first original image signal, the first compensation image signal, the second original image signal, and the second compensation image signal are output i, k, j, and k times, respectively. Thus, a trembling phenomenon perceived by a viewer of a film image may be prevented.

12 Claims, 13 Drawing Sheets

METHOD OF DRIVING DISPLAY APPARATUS AND DRIVING CIRCUIT FOR DISPLAY APPARATUS USING THE SAME

CROSS-REFERENCE TO RELATED APPLICATION

This application relies for priority upon Korean Patent Application No. 2008-80064 filed on Aug. 14, 2008, the contents of which are herein incorporated by reference in its entirety.

BACKGROUND

1. Technical Field

The present disclosure relates to a method of driving a display apparatus and a driving circuit for a display apparatus using the driving method, which are capable of preventing a trembling phenomenon of a film image.

2. Discussion of Related Art

In general, a display apparatus receives image signals from an external system and displays images corresponding to the image signals on a screen.

The display apparatus, recently, has been applied to various fields, and thus the display apparatus displays not only a normal video image but also a film image that was recorded in photographic film.

Because the film image is recorded in the photographic film at 24 frames per second and the display apparatus is operated at 60 Hz, however, the external system applies the film image signal to the display apparatus after converting the film image signal recorded at 24 frames per second into an image signal at 60 frames per second.

In order to convert the film image recorded at 24 frames per second into an image at 60 frames per second for display, odd-numbered frames among the 24 frames are repeated three times and even-numbered frames among the 24 frames are repeated two times, thereby expanding the film image recorded at 24 frames per second into film image at 60 frames per second.

When applying the above-described method, however, the human eye recognizes a trembling phenomena of the images displayed on the display apparatus because the odd-numbered frames have different display intervals from the display intervals of the even-numbered frames. As a result, when displaying the expanded film image on the display apparatus, display characteristics of the display apparatus are degraded.

SUMMARY

An exemplary embodiment of the present invention provides a method of driving a display apparatus capable of preventing a trembling phenomenon of a converted film image.

An exemplary embodiment of the present invention also provides a driving circuit for a display apparatus using the driving method.

In an exemplary embodiment of the present invention, a method of driving a liquid crystal display apparatus includes receiving an image signal in response to a synchronizing signal having a first frequency; discriminating whether the image signal is a signal corresponding to a film image or a signal corresponding to a video image; converting the synchronizing signal into a driving signal having a second frequency higher than the first frequency; extracting, when the image signal is the film image signal corresponding to the film image, first, second and third original image signals based on the film image signal, which are successive; generating a first compensation image signal based on the first original image signal and the second original image signal and generating a second compensation image signal based on the second original image signal and the third original image signal; and sequentially outputting the first original image signal, the first compensation image signal, the second original image signal, and the second compensation image signal in response to the driving signal. The first original image signal, the first compensation image signal, the second original image signal, and the second compensation image signal are output i times, k times, j times, and k times, respectively.

In an exemplary embodiment of the present invention, a method of driving a display apparatus includes receiving an image signal in response to a synchronizing signal having a first frequency; discriminating whether the received image signal is a signal corresponding to a film image or a signal corresponding to a video image; converting the synchronizing signal into a driving signal having a second frequency higher than the first frequency; extracting, if the image signal is a film image signal corresponding to the film image, first and second original image signals based on the film image signal, which are successive; and sequentially outputting the first and second original image signals i times in response to the driving signal.

In an exemplary embodiment of the present invention, a driving circuit for a display apparatus receives an image signal based on a synchronizing signal having a first frequency. The driving circuit includes an image signal discriminator, an original image signal extractor, an image signal converter, a frequency modulator, and a data outputter.

The image signal discriminator discriminates whether the image signal is a signal corresponding to a film image or a signal corresponding to a video image, and the original image signal extractor extracts first, second and third original image signals, which are successive, based on a film image signal if the image signal is the film image signal corresponding to the film image.

The image signal converter generates first and second compensation image signals based on the first, second and third original image signals, and the frequency modulator converts the synchronizing signal into a driving signal having a second frequency higher than the first frequency.

The data outputter outputs the first original image signal i times, the second original image signal j times, the first compensation image signal k times, and the second compensation image signal k times.

According to the above-described exemplary embodiment, the original image signal is extracted from the film image signal, the compensation image signal is generated based on the extracted original image signal, and the original image signal and the compensation image signal have a frequency higher than a frequency of the film image signal. Thus, a trembling phenomenon of the film image may be prevented, and interruption of the displayed image, which is caused by an abrupt motion variation, may be prevented.

BRIEF DESCRIPTION OF THE DRAWINGS

Exemplary embodiments of the present invention will be understood in more detail from the following descriptions taken in conjunction with the accompanying drawings, wherein.

DESCRIPTION OF EXEMPLARY EMBODIMENTS

Hereinafter, exemplary embodiments of the present invention will be explained in detail with reference to the accompanying drawings.

Figure 1:
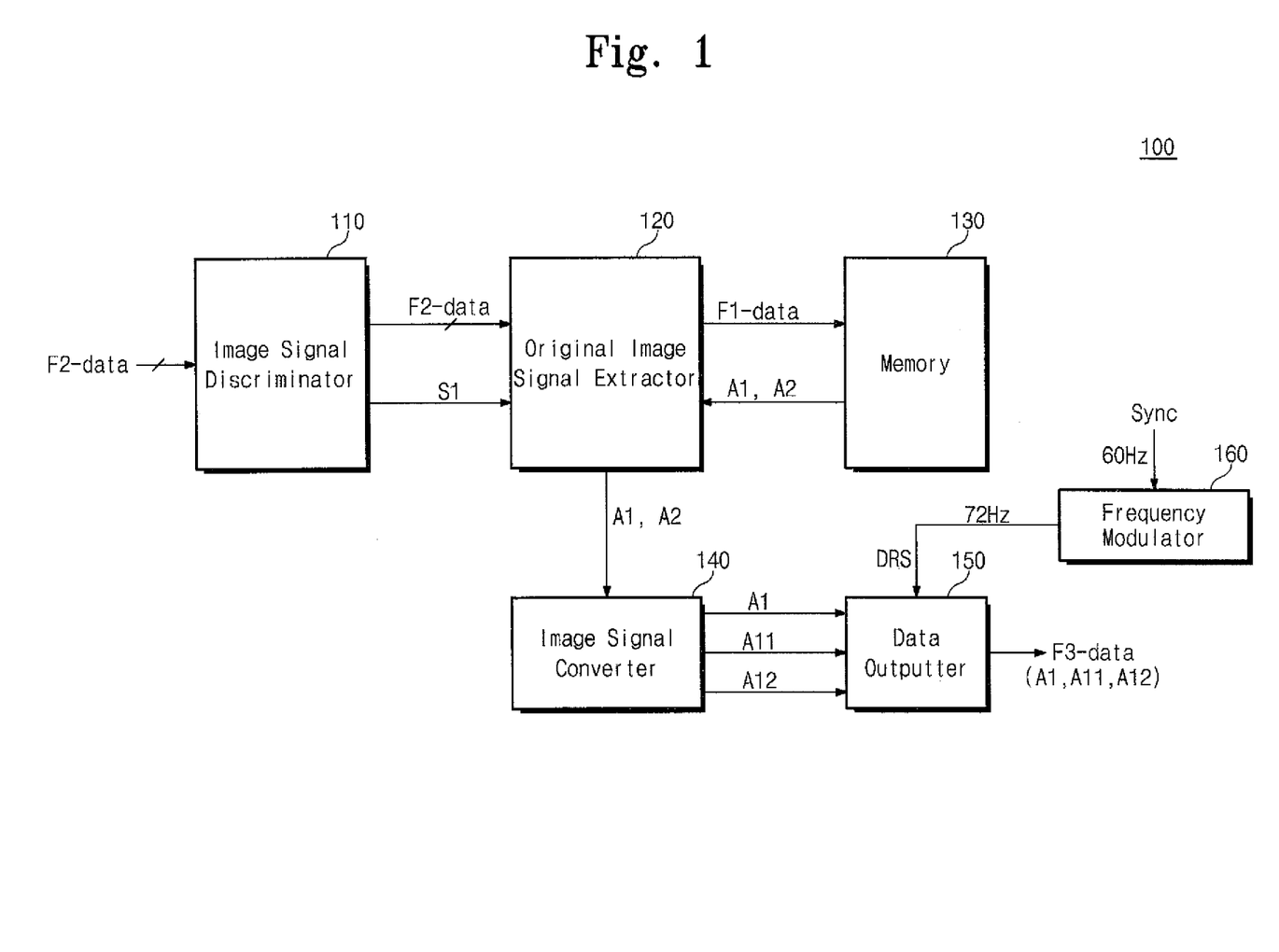
FIG. 1 is a block diagram showing an exemplary embodiment of a driving circuit for a display apparatus according to the present invention.
Figure 2:
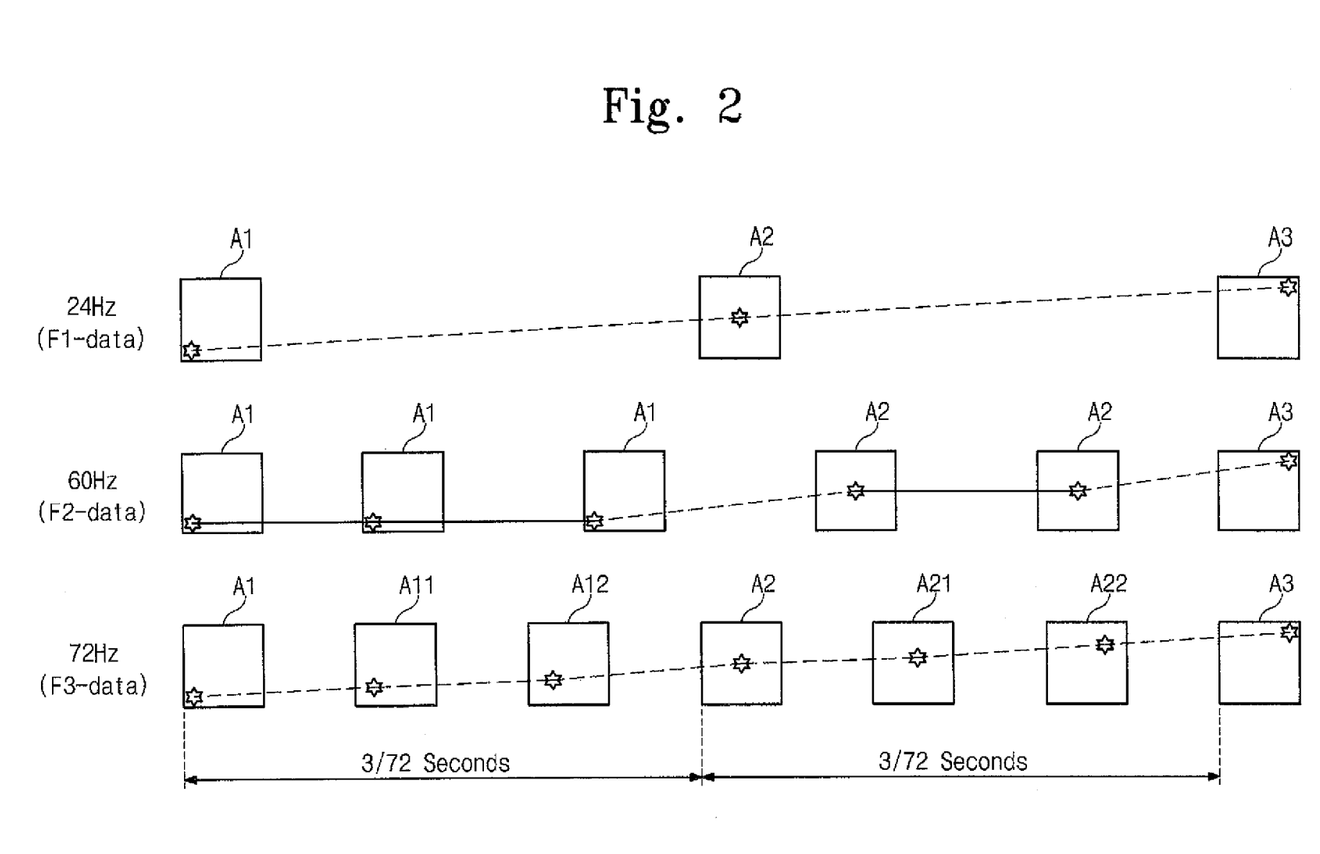
FIG. 2 is a representation useful in explaining a driving method of the driving circuit shown in FIG. 1.

FIG. 1 is a block diagram showing an exemplary embodiment of a driving circuit for a display apparatus according to the present invention, and FIG. 2 is a representation useful in explaining a driving method of the driving circuit shown in FIG. 1.

Referring to FIG. 1, a driving circuit 100 for a display apparatus includes an image signal discriminator 110, an original image signal extractor 120, a memory 130, an image signal converter 140, a data outputter 150, and a frequency modulator 160.

The image signal discriminator 110 receives an image signal from an external system (not shown) and discriminates whether the image signal is a normal image signal used to display a normal video image or a film image signal used to display a film image. On the assumption that the display apparatus is applied to a television set, the normal image is defined as an image presented through a normal broadcasting service and the film image is defined as an image of a moving picture reproduced by using a film.

The normal image signal may be provided to the driving circuit 100 at a frequency of 60 Hz, however, because the film image signal is recorded onto a film at a frequency of 24 Hz, the film image signal of 24 Hz may be provided to the driving circuit 100 after being converted to an image signal of 60 Hz by the external system (not shown).

As shown in FIG. 2, the external system receives 24 frame data per second (24 Hz) and outputs 60 frame data per second (60 Hz). To this end, the external system repeatedly outputs odd-numbered frame data of the 24 frame data three times and repeatedly outputs even-numbered frame data of the 24 frame data two times, so that the external system may output the 60 frame data using the 24 frame data. Accordingly, the film image signal F2-data converted to have the frequency of 60 Hz by the external system is sequentially applied to the image signal discriminator 110.

The image signal discriminator 110 receives the image signal F2-data from the external system (not shown) and discriminates whether the image signal is the normal image signal or the film image signal. If the image signal is the film image signal, the image signal discriminator 110 provides the film image signal F2-data and a discrimination signal S1 indicating that the image signal is the film image signal F2-data to the original image signal extractor 120.

The original image signal extractor 120 is operated in response to the discrimination signal S1. The original image signal extractor 120 converts the film image signal F2-data of 60 Hz into the film image signal F1-data of 24 Hz, and extracts original image signal from the converted film image signal of 24 Hz. That is, the original image signal extractor 120 extracts 24 original image signals (24 Hz) from 60 film image signals (60 Hz) sequentially applied from the image signal discriminator 110. Then, the 24 original image signals extracted by the original image signal extractor 120 are sequentially stored into the memory 130.

In addition, the original image signal extractor 120 reads out from the memory 130 first and second original image signals A1 and A2 corresponding to two successive frames of the 24 original image signals, and provides the first and second original image signals A1 and A2 to the image signal converter 140.

The image signal converter 140 generates first and second compensation image signals A11 and A12 using motion vectors generated based on the first and second original image signal A1 and A2. More specifically, each of the first and second compensation image signals A11 and A12 serves as a signal that displays a respective one of several intermediate images existing between a first original image corresponding to the first original image signal A1 and a second original image corresponding to the second original image signal A2.

As shown in FIG. 2, in the present exemplary embodiment, the first original image signal A1 is used to display a star located at a first position, and the second original image signal A2 is used to display the star located at a second position. A motion vector of the star is calculated using the first and second original image signals A1 and A2. Then, based on the motion vector, the image signal converter 140 generates the first and second compensation image signals A11 and A12 to display stars located on a moving path of the star between the first original image signal A1 and the second original image signal A2.

The first original image signal A1, the first compensation image signal A11, and the second compensation image signal A12 are provided to the data outputter 150 from the image signal converter 140. In addition, the data outputter 150 receives a driving signal DRS having a frequency of 72 Hz from the frequency modulator 160. The frequency modulator 160 receives a synchronizing signal of 60 Hz from the external system (not shown), modulates the frequency of the synchronizing signal, and outputs the driving signal DRS of 72 Hz to the data outputter 150. Thus, the data outputter 150 sequentially outputs the first original image signal A1, the first compensation image signal A11, and the second compensation image signal A12 as F3-data in response to the driving signal DRS having the frequency of 72 Hz.

Then, the original image signal extractor 120 reads out the second original image signal A2 and a third original image signal A3 shown in FIG. 2 from the memory 130 and provides the second and third original image signals A2 and A3 to the image signal converter 140. The image signal converter 140 generates third and fourth compensation image signals A21 and A22 shown in FIG. 2 using a motion vector calculated based on the second and third original image signals A2 and A3. Each of the third and fourth compensation image signals A21 and A22 serves as a signal that displays one of the intermediate images existing between the second original image corresponding to the second original image signal A2 and a third original image corresponding to the third original image signal A3.

The second original image signal A2, the third compensation image signal A21, and the fourth compensation image signal A22 are provided to the data outputter 150. The data outputter 150 sequentially outputs the second original image signal A2, the third compensation image signal A21, and the fourth compensation image signal A22 in response to the driving signal DRS of 72 Hz.

As shown in FIG. 2, the data outputter 150 sequentially outputs the first original image signal A1, the first compensation image signal A11 and the second compensation image signal A12 during $3/72$ seconds, which corresponds to a $1/24$ of a second, and sequentially outputs the second original image signal A2, the third compensation image signal A21 and the fourth compensation image signal A22 during a next $3/72$ seconds, which corresponds to a $1/24$ of a second.

When repeatedly performing the above-described processes, the driving circuit 100 for the display apparatus may convert the film image signal F2-data of 60 Hz into the film image signal F3-data of 72 Hz, thereby applying the film image signal F3-data to a display panel (not shown).

In other words, in the previously known system when odd-numbered original image signals A1 and A3 among 24 original image signals are repeated three times and even-numbered original image signals A2 and A4 among the 24 original image signals are repeated three times in order to display 24 original image signals at 60 Hz, the star is displayed at different times in each frame. As a result, it appears to the human eye that the image is trembling.

On the other hand, according to an exemplary embodiment of the present invention, when the 24 original image signals are converted into 72 Hz, each original image signal is repeatedly displayed, thereby preventing the trembling phenomena of the displayed image. In addition, because the compensation image signal is inserted between the original image signals at least one time, interruption of the displayed image, which is caused by an abrupt motion variation, may be prevented.

In FIGS. 1 and 2, a process that the film image signal F2-data of 60 Hz is converted into the film image signal F3-data of 72 Hz has been described, but the film image signal F2-data of 60 Hz may also be converted into a film image signal F4-data of 96 Hz or a film image signal F5-data of 120 Hz according to other exemplary embodiments of the present invention. Hereinafter, a process that converts the film image signal F2-data into the film image signal F4-data of 96 Hz will be described with reference to FIG. 3, and a process that converts the film image signal F2-data into the film image signal F5-data of 120 Hz will be described with reference to FIG. 4.

Figure 3:
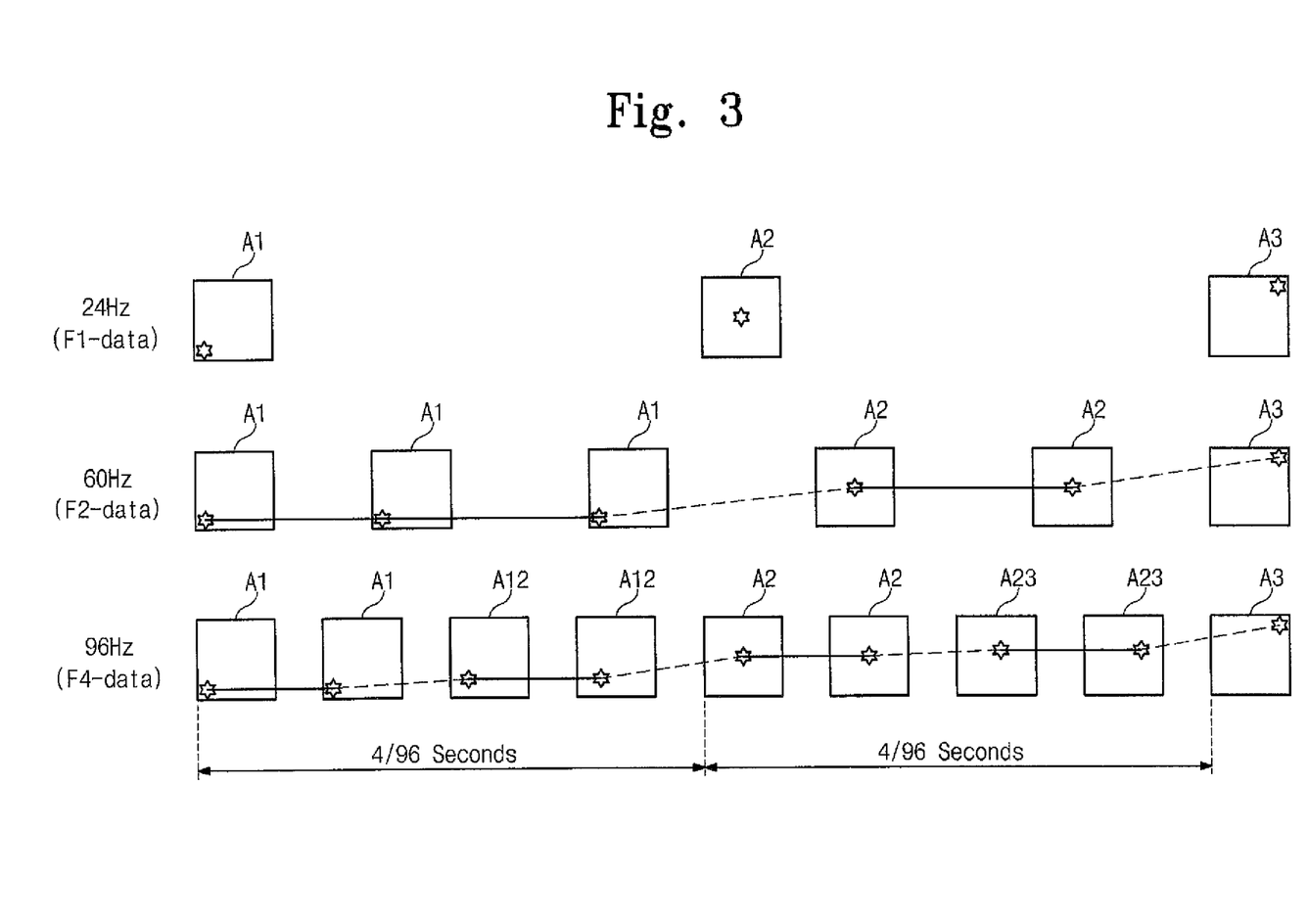
FIG. 3 is a representation showing a state in which a film image signal of 60 Hz is converted into a film image signal of 96 Hz.

FIG. 3 is a representation showing a state in which a film image signal of 60 Hz is converted into a film image signal of 96 Hz. In the present exemplary embodiment, a driving circuit used to convert the film image signal F2-data of 60 Hz into the film image signal F4-data of 96 Hz has the same circuit configuration as that of the driving circuit 100 of FIG. 1, however, the frequency modulator 160 modulates the synchronizing signal Sync into a driving signal DRS having a frequency of 96 Hz and the driving signal DRS of 96 Hz is applied to the data outputter 150. Accordingly, the process that converts the film image signal F2-data of 60 Hz into the film image signal F4-data of 96 Hz will be described with reference to FIGS. 1 and 3.

Referring to FIGS. 1 and 3, the image signal discriminator 110 receives the image signal F2-data from the external system (not shown) and discriminates whether the image signal F2-data is the normal video image signal or the film image signal. If the image signal is the film image signal, the original image signal extractor 120 extracts the original image signal from the film image signal of 60 Hz. Then, the original image signal extractor 120 reads out first and second original image signals A1 and A2 adjacent each other among the extracted 24 original image signals, and provides the first and second original image signals A1 and A2 to the image signal converter 140.

The image signal converter 140 generates a first compensation image signal A12 based on the first and second original image signals A1 and A2. The first original image signal A1 and the second compensation image signal A12 shown in FIG. 3 are provided to the data outputter 150.

The frequency modulator 160 receives the synchronizing signal Sync of 60 Hz from the external system and modulates the frequency of the synchronizing signal Sync to output the driving signal DRS having the frequency of 96 Hz to the data outputter 150. Thus, the data outputter 150 outputs the first original image signal A1 and the second compensation image signal A12 in response to the driving signal DRS having the frequency of 96 Hz.

As shown in FIG. 3, the data outputter 150 outputs the first original image signal A1 two times, and then outputs the second compensation image signal A12 two times during the $4/96$ seconds, which again is a $1/24$ of a second.

Then, the second original image signal A2 and a fifth compensation image signal A23 are provided to the data outputter 150. Accordingly, the data outputter 150 outputs the second original image signal A2 and the fifth compensation image signal A23 two times during next $4/96$ seconds.

When repeatedly performing the above-described processes, the driving circuit 100 for the display apparatus may convert the film image signal F2-data of 60 Hz into the film image signal F4-data of 96 Hz, thereby applying the film image signal F4-data to a display panel (not shown).

As described above, when the film image signal F2-data of 60 Hz is converted into the film image signal F4-data of 96 Hz, each original image signal is repeatedly displayed two times, thereby preventing the trembling phenomena of the displayed image. In addition, since the compensation image signal is inserted between the original image signals, interruption of the displayed image may be prevented.

Figure 4:
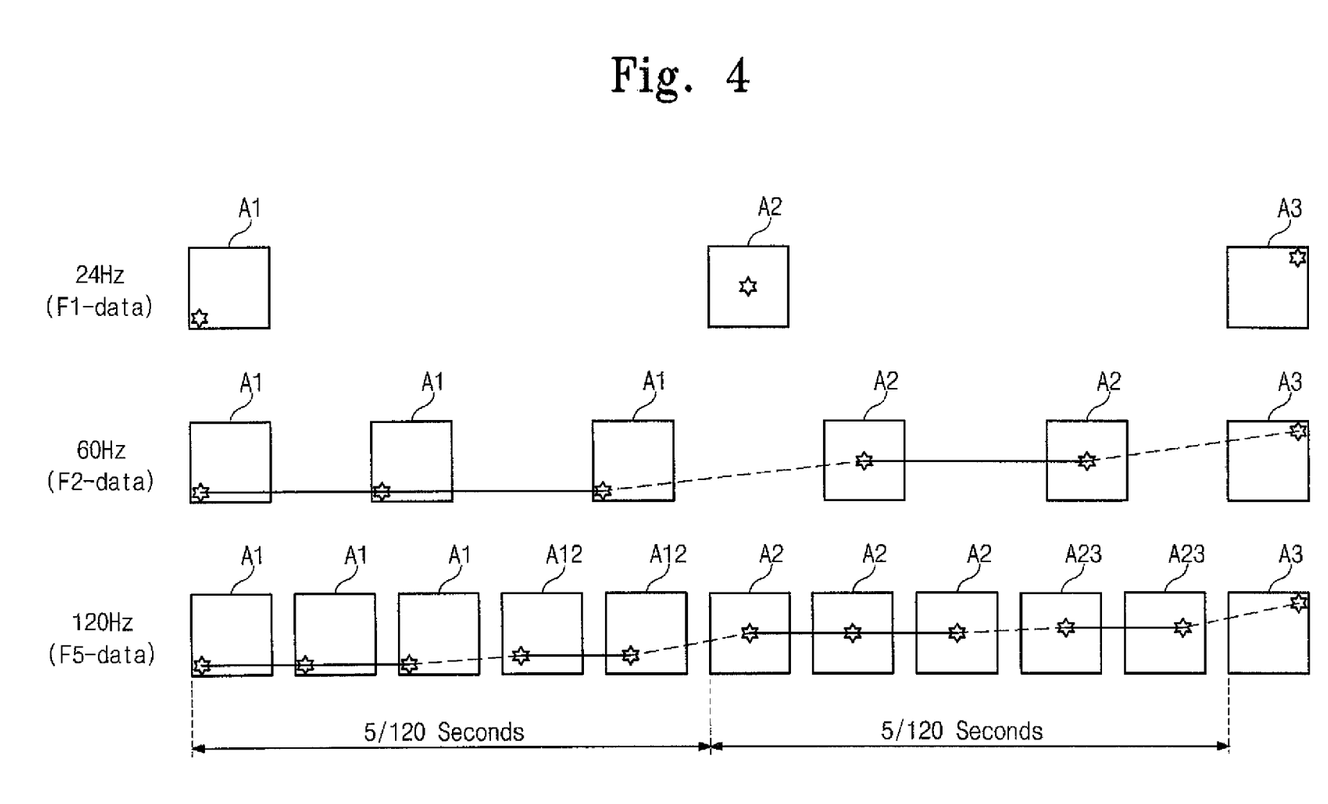
FIGS. 4 to 6 are representations showing states in which a film image signal of 60 Hz is converted into a film image signal of 120 Hz.

FIG. 4 is a view showing a state in which a film image signal of 60 Hz is converted into a film image signal of 120 Hz. In FIG. 4, a further description of the same processes as those described in relation to FIGS. 1 to 3 will be omitted in order to avoid redundancy.

Referring to FIGS. 1 and 4, during a first $5/120$ seconds, the data outputter 150 outputs the first original image signal A1 three times and outputs the second compensation image signal A12 two times.

Then, during the next $5/120$ seconds, the data outputter 150 outputs the second original image signal A2 three times and outputs the fifth compensation image signal A23 two times. When repeatedly performing the above-described processes, the driving circuit 100 for the display apparatus may convert the film image signal F2-data of 60 Hz into the film image signal F5-data of 120 Hz, thereby applying the film image signal F5-data to a display panel (not shown).

As described above, when the film image signal F2-data of 60 Hz is converted into the film image signal F5-data of 120 Hz, each original image signal is repeatedly displayed three times, thereby preventing the trembling phenomena of the displayed image present in previously proposed systems. In addition, because the compensation image signal is inserted between the original image signals, interruption of the displayed image is prevented.

Figure 5:
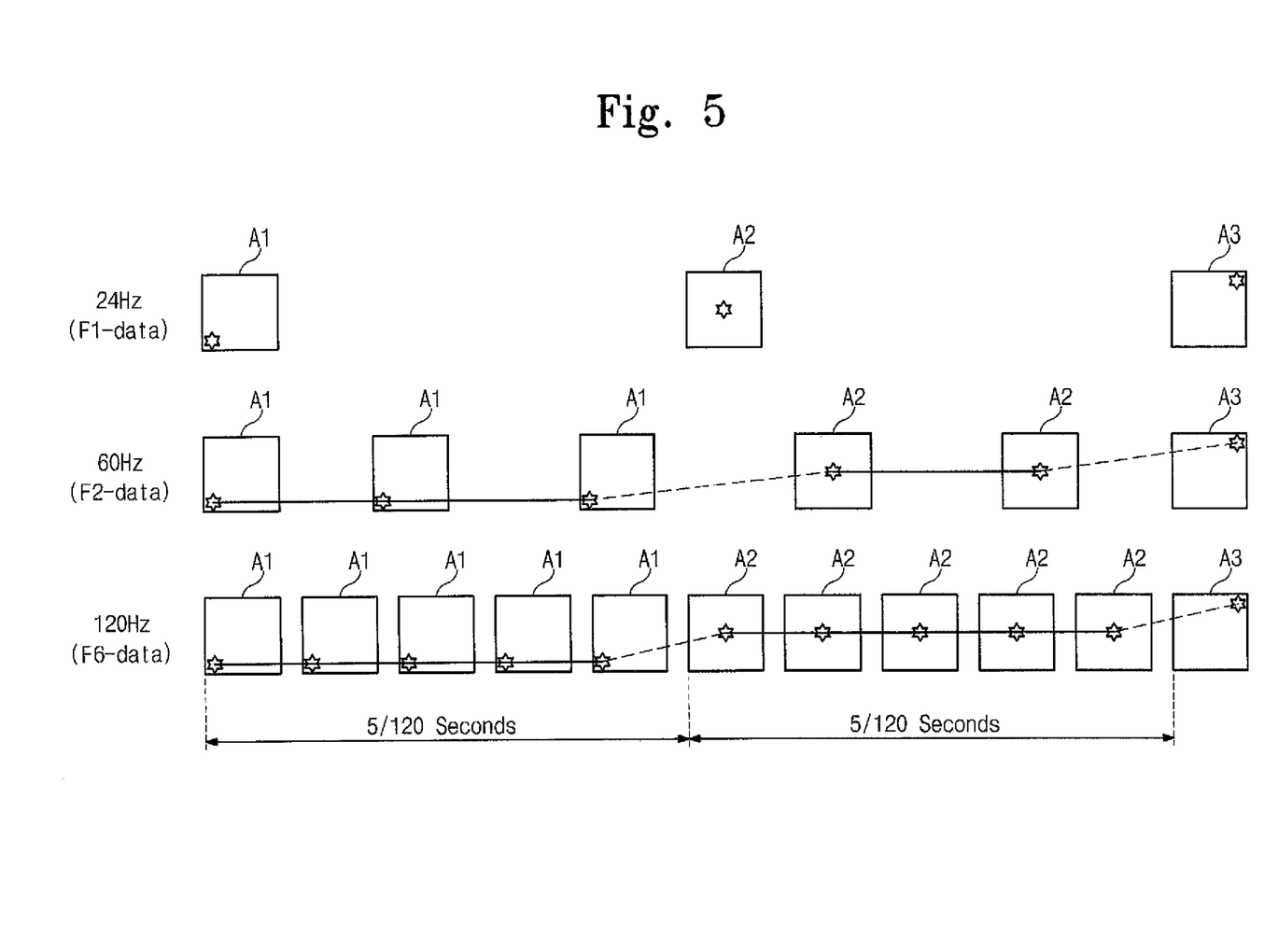

FIG. 5 is a representation showing a state in which a film image signal of 60 Hz is converted into a film image signal of 120 Hz.

Referring to FIG. 5, the data outputter 150 outputs the first original image signal A1 five times during 5/120 seconds, and outputs the second original image signal A2 five times during next 5/120 seconds. Thus, the driving circuit 100 for the display apparatus may convert the film image signal F2-data of 60 Hz into the film image signal F6-data of 120 Hz, thereby applying the film image signal F6-data to a display panel (not shown).

As described above, when the film image signal F2-data of 60 Hz is converted into the film image signal F6-data of 120 Hz, each original image signal is repeatedly displayed five times, thereby preventing the trembling phenomena of the displayed image.

Figure 6:
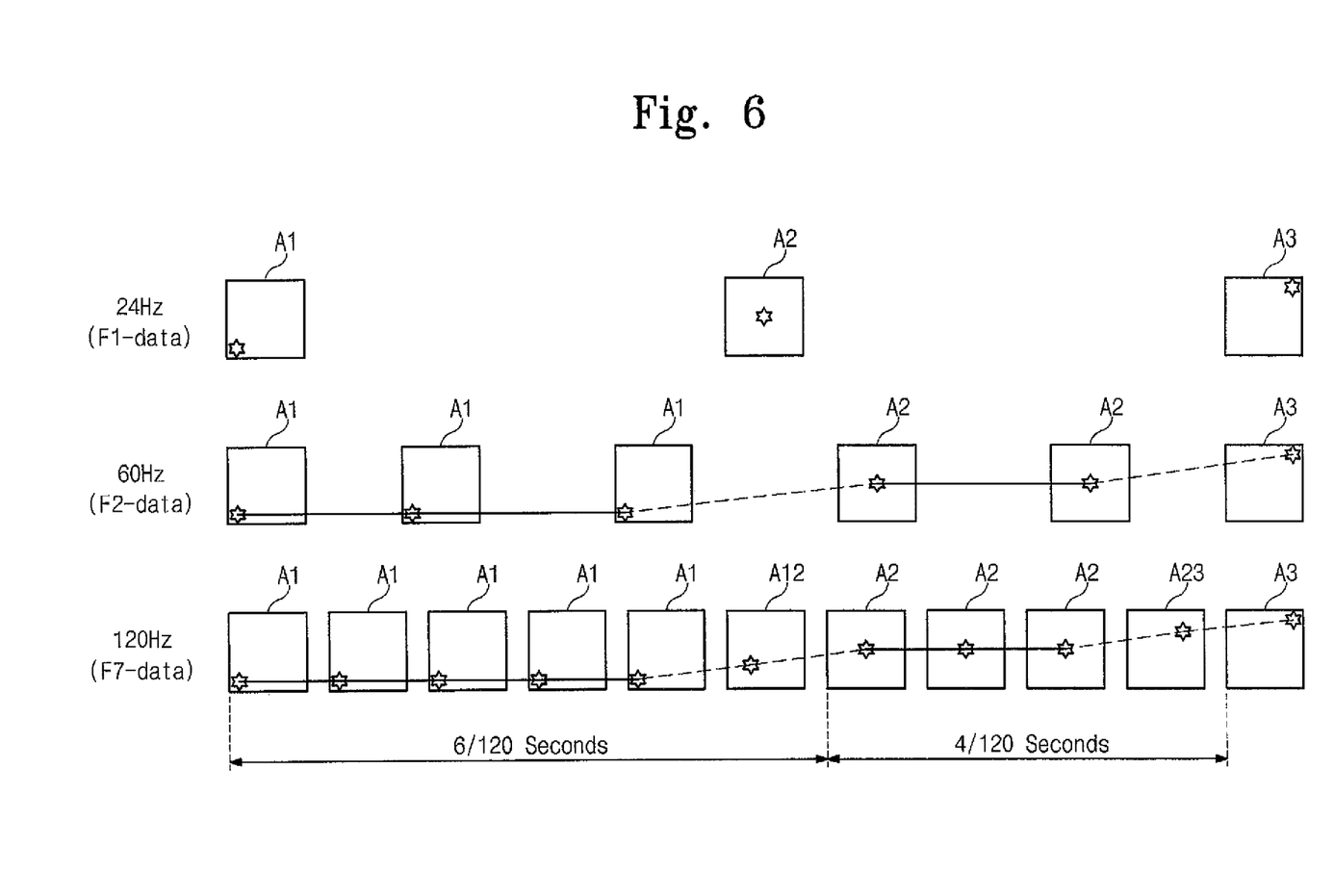

FIG. 6 is view showing a state in which a film image signal of 60 Hz is converted into a film image signal of 120 Hz.

Referring to FIG. 6, during 6/120 seconds, the data outputter 150 outputs the first original image signal A1 five times and then outputs one second compensation image signal A12. In FIG. 6, the second compensation image signal A12 serves as a signal that displays one of intermediate images existing between the first original image corresponding to the first original image signal A1 and the second original image corresponding to the second original image signal A2.

Next, during 4/120 seconds, the data outputter 150 outputs the second original image signal A2 three times and then outputs the fifth compensation image signal A23. The fifth compensation image signal A23 serves as a signal that displays one of the intermediate images existing between the second original image corresponding to the second original image signal A2 and the third original image corresponding to the third original image signal A3.

When repeatedly performing the above-described processes, the driving circuit 100 for the display apparatus may convert the film image signal F2-data of 60 Hz into the film image signal F7-data of 120 Hz, thereby applying the film image signal F7-data to a display panel (not shown).

As described above, the film image signal F2-data of 60 Hz is converted into the film image signal F6-data of 120 Hz, and the compensation image signal is inserted between the original image signals at least one time, so that interruption of the displayed image, which is caused by an abrupt motion variation, may be prevented.

Figure 7A:
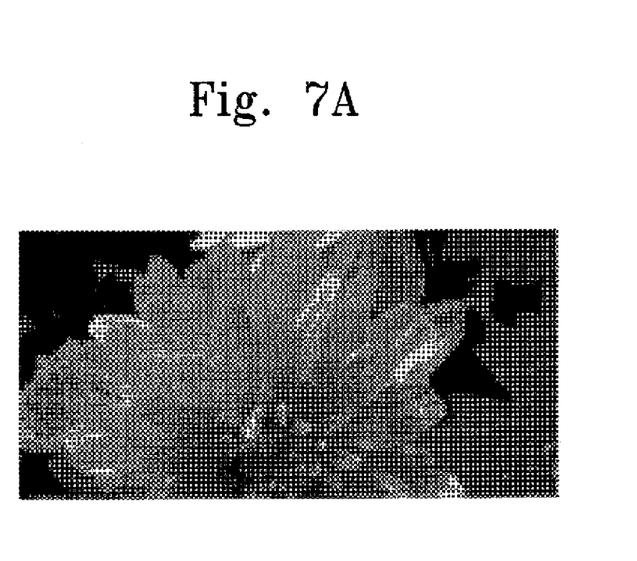
FIG. 7A is a view showing an image of an n-th frame.
Figure 7B:
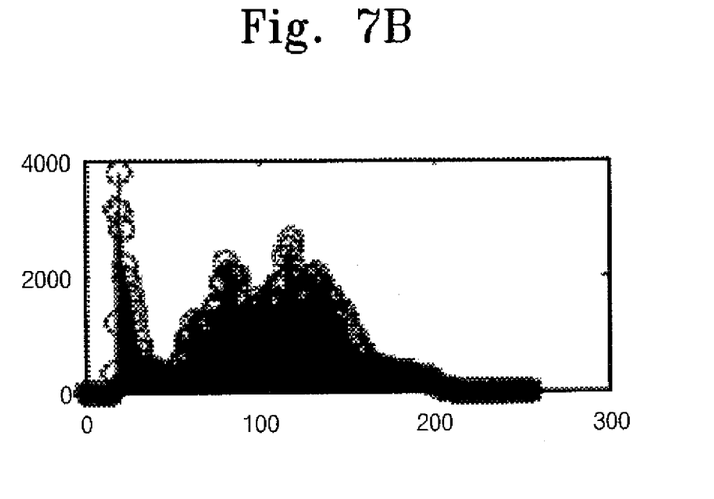
FIG. 7B is a histogram showing the brightness distribution of the image shown in FIG. 7A.
Figure 8A:
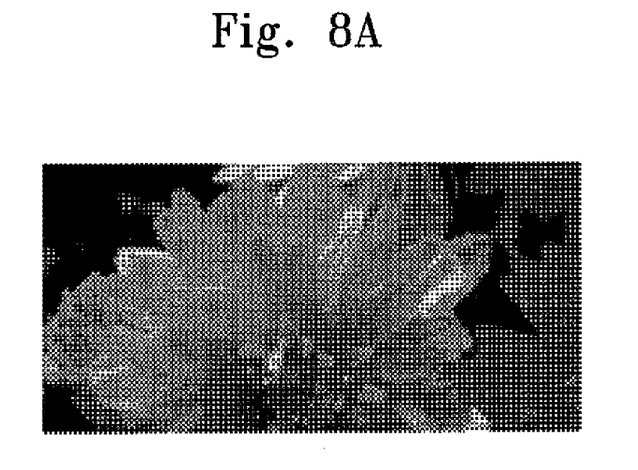
FIG. 8A is a view showing an image of an (n+1)-th frame.
Figure 8B:
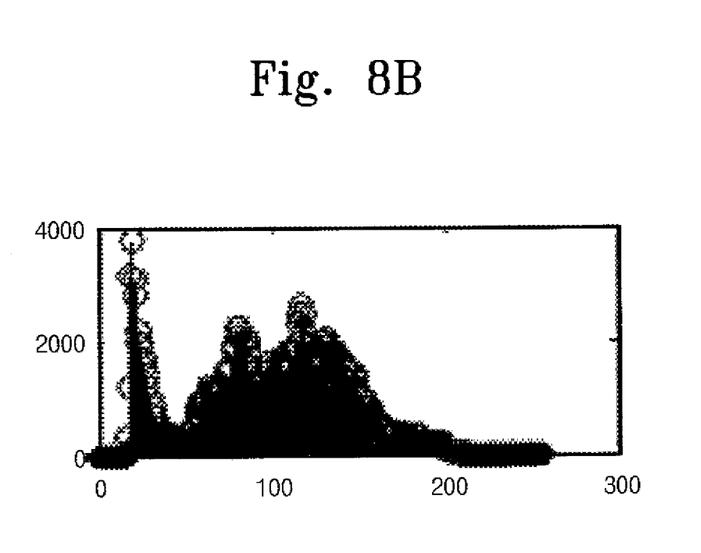
FIG. 8B is a histogram showing the brightness distribution of the image shown in FIG. 8A.

FIG. 7A is a view showing an image of an n-th frame, and FIG. 7B is a histogram showing the brightness distribution of the image shown in FIG. 7A. FIG. 8A is a view showing an image of an (n+1)-th frame, and FIG. 8B is a histogram showing the brightness distribution of the image shown in FIG. 8A. In FIGS. 7B and 8B, an x-axis represents a gray scale and a y-axis represents a number of pixels.

Comparing FIGS. 7A and 8A, it is seen that there is no movement between an image of the n-th frame and an image of the (n+1)-th. In this case, as shown in FIGS. 7B and 8B, the n-th frame and the (n+1)-th frame have the same brightness distribution.

Figure 9:
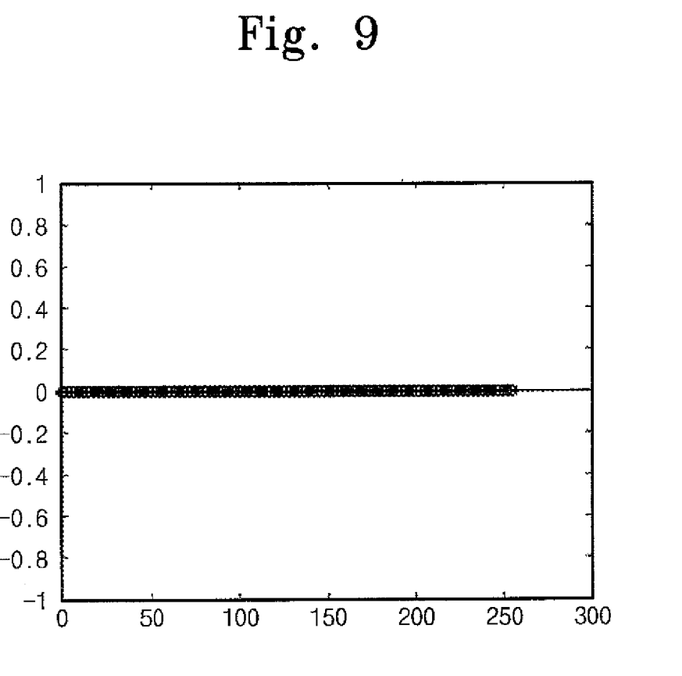
FIG. 9 is a histogram showing a brightness difference between the n-th frame and the (n+1)-th frame.

FIG. 9 is a histogram showing a brightness difference between an n-th frame and an (n+1)-th frame.

Referring to FIG. 9, the difference of the brightness histograms between the n-th frame and the (n+1)-frame has been observed as zero. That is, because the brightness difference between the n-th frame and the (n+1)-th frame is zero, the n-th frame and the (n+1)-th frame display the same image, which corresponds to FIGS. 7A and 8A.

Figure 10A:
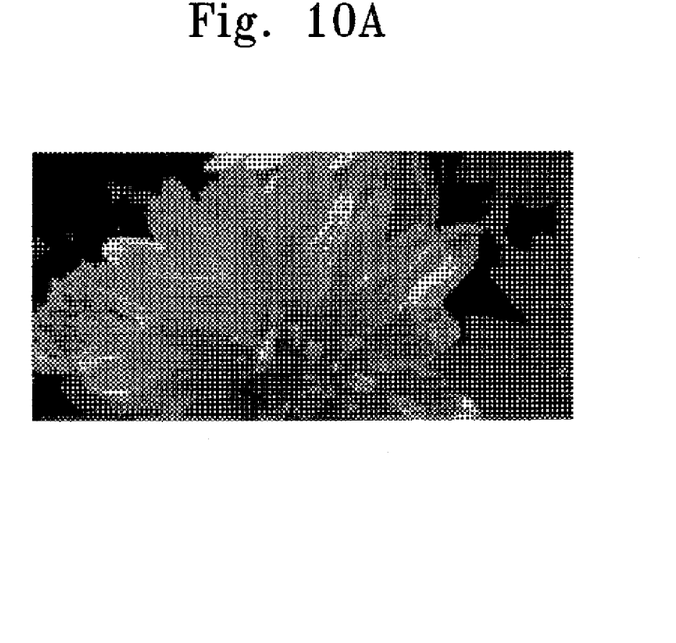
FIG. 10A is a view showing an image of an n-th frame.
Figure 10B:
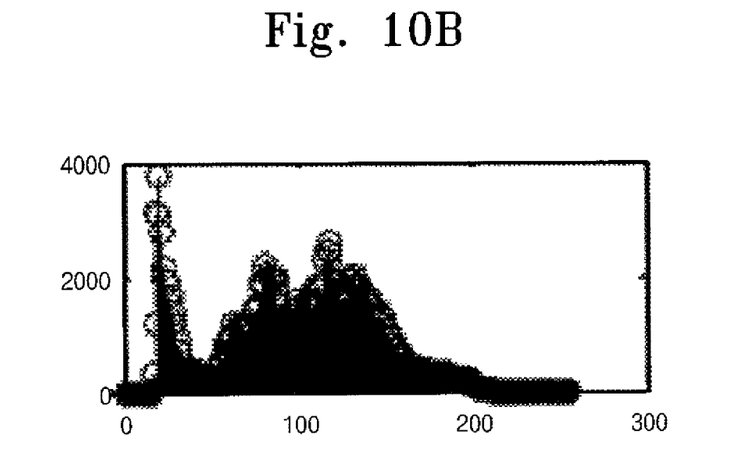
FIG. 10B is a histogram showing the brightness distribution of the image shown in FIG. 10A.
Figure 11A:
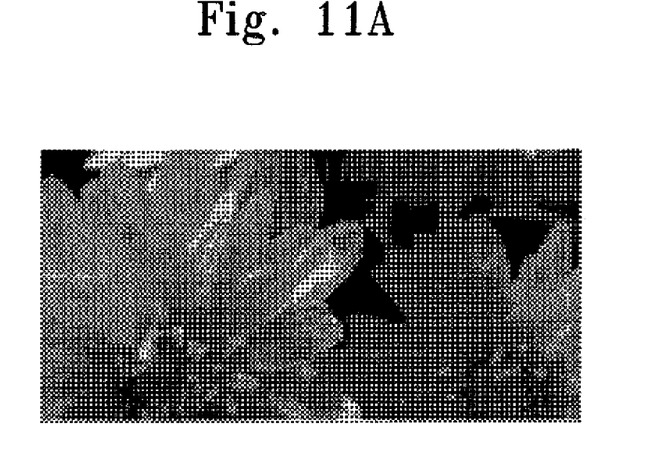
FIG. 11A is a view showing an image of an (n+1)-th frame.
Figure 11B:
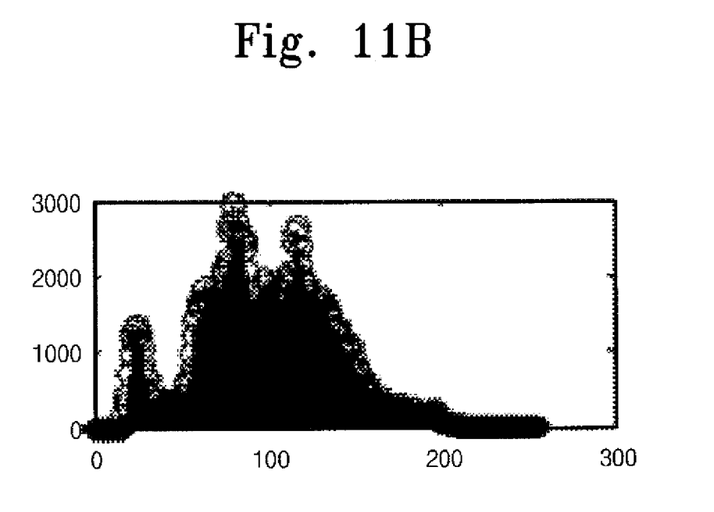
FIG. 11B is a histogram showing the brightness distribution of the image shown in FIG. 11A.

FIG. 10A is a view showing an image of an n-th frame and FIG. 10B is a histogram showing the brightness distribution of the image shown in FIG. 10A. FIG. 11A is a view showing an image of an (n+1)-th frame and FIG. 11B is a histogram showing the brightness distribution of the image shown in FIG. 11A. In FIGS. 10B and 11B, an x-axis indicates a gray scale and a y-axis indicates a number of pixels.

Referring to FIGS. 10A and 11A, when comparing the n-th frame with the (n+1)-th frame, it is seen that the image of the (n+1)-th frame has been moved toward a left side. In this case, as shown in FIGS. 10B and 11B, the n-th frame and the (n+1)-th frame have a respective brightness different from each other.

Figure 12:
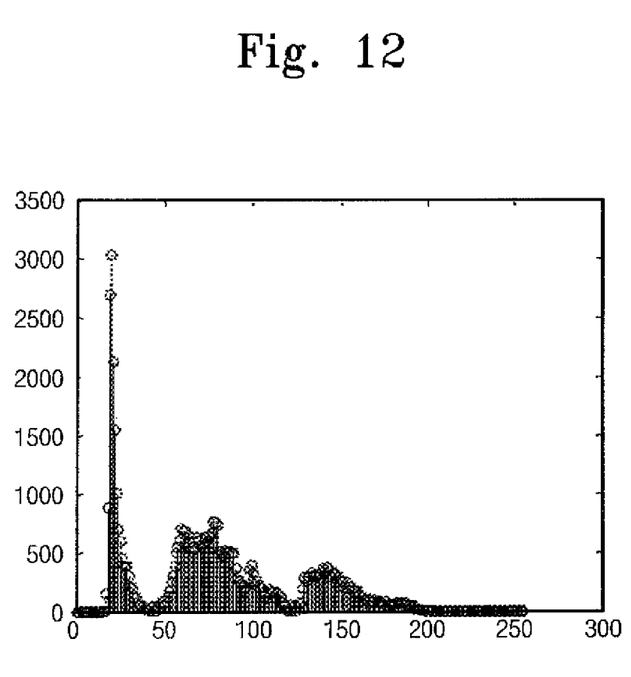
FIG. 12 is a histogram showing a brightness difference between the n-th frame and the (n+1)-th frame.

FIG. 12 is a histogram showing a brightness difference between the n-th frame and the (n+1)-th frame, wherein the X-axis represents a gray scale and the Y-axis represents the number of pixels.

Referring to FIG. 12, the difference of brightness histograms between the n-th frame and the (n+1)-frame has been observed. In this manner, when comparing the brightness histogram of the n-th frame and the brightness histogram of the (n+1)-th frame, a state may be observed, in which the n-th frame and the (n+1)-th frame display different images from each other or the image of the (n+1)-th frame moves relative to the n-th frame.

According to an exemplary embodiment of the present invention, the image signal discriminator 110 shown in FIG. 1 compares the brightness histograms with each other to discriminate whether the image signal applied from the external system is the normal video image signal or the film image signal. That is, because the film image signal of 60 Hz is repeatedly applied three times or two times from the external system, if the brightness difference does not occur during the three times or two times, the image signal is considered as the film image signal.

Figure 13:
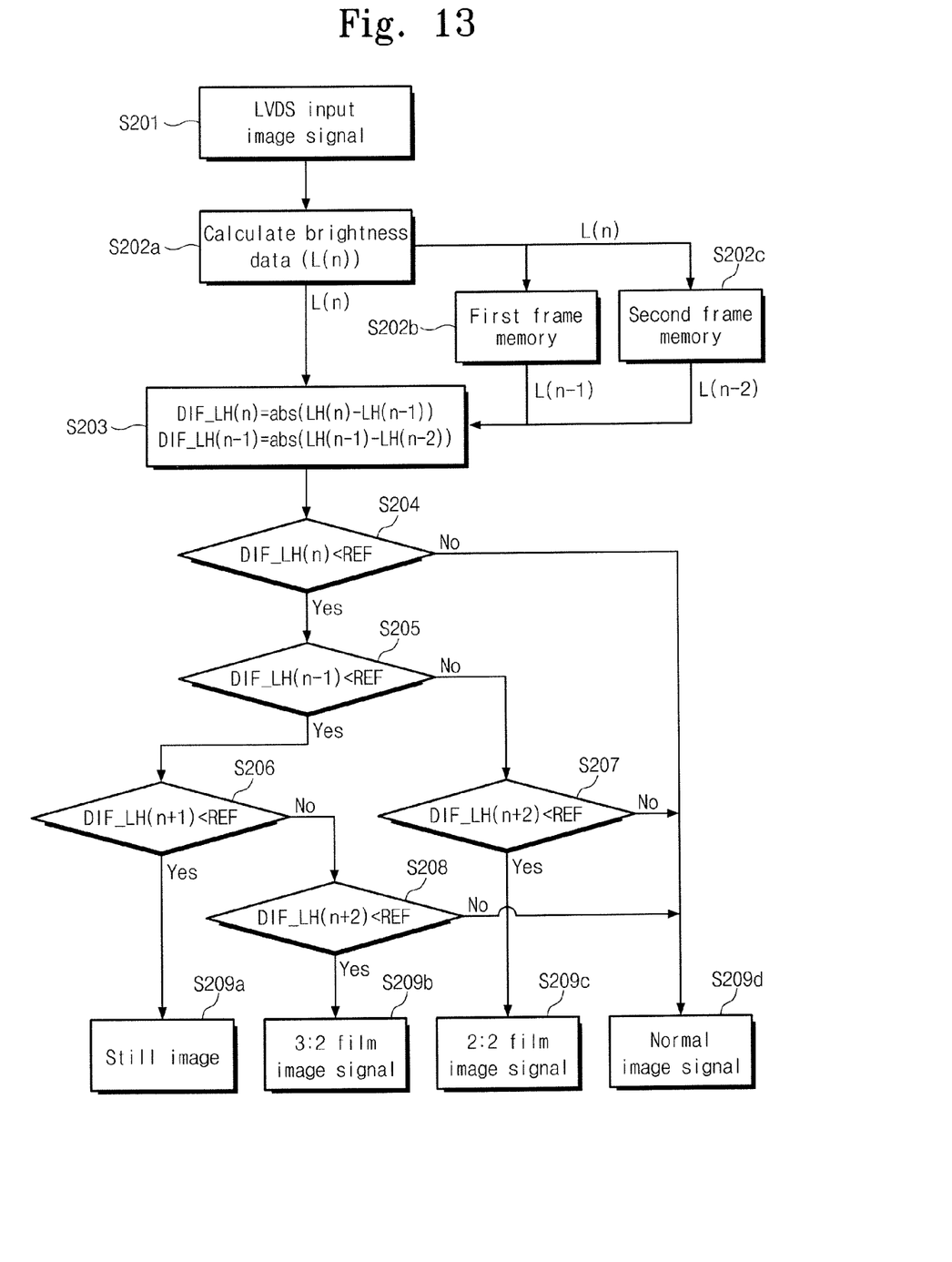
FIG. 13 is a flow chart illustrating an operation process of an image signal discriminator shown in FIG. 1.

FIG. 13 is a flow chart illustrating an operation process of the image signal discriminator 110 shown in FIG. 1.

Referring to FIG. 13, the image signal discriminator 110 receives the image signal corresponding to the n-th frame through a low-voltage differential signaling (LVDS) (S201). The image signal discriminator 110 calculates brightness data L(n) of the image signal of the n-th frame based on the input image signal (S202a). The calculated brightness L(n) is stored in first and second frame memories (S202b and S202c). The first and second frame memories sequentially store brightness data for every frame.

Based on the n-th brightness data L(n) of the input image signal, the (n−1)-th brightness data L(n−1) read-out from the first frame memory, and the (n−2)-th brightness data L(n−2) read-out from the second frame memory, the difference of the brightness histogram between two adjacent frames is obtained (S203). More specifically, an absolute value obtained by subtracting the (n−1)-th brightness histogram LH(n−1) from the n-th brightness histogram LH(n) is defined as a first brightness difference value DIF_LH(n), and an absolute value obtained by subtracting the (n−2)-th brightness histogram LH(n−2) from the (n−1)-th brightness histogram LH(n−1) is defined as a second brightness difference value DIF_LH(n−1) (S203).

In FIG. 13, only the first and second brightness difference values DIF_LH(n) and DIF_LH(n−1) have been described but, if necessary, third and fourth brightness difference values DIF_LH(n+1) and DIF_LH(n+2) may be sequentially calculated using the (n+1)-th and the (n+2)-th brightness histograms.

The first brightness difference value DIF_LH(n) is compared with a predetermined reference value REF to discriminate whether the first brightness difference value DIF_LH(n) is smaller than the predetermined reference value REF (S204). If the first brightness difference value DIF_LH(n) is smaller than the reference value REF, the second brightness difference value DIF_LH(n−1) is compared with the reference value REF (S205). If the first brightness difference value DIF_LH(n) is equal to or greater than the reference value REF, a signal indicating that the input image signal is the normal image signal is output (S209d).

Then, if the second brightness difference value DIF_LH (n−1) is smaller than the reference value REF, the third brightness difference value DIF_LH(n+1) is compared with the reference value REF (S206). If the second brightness difference value DIF_LH(n−1) is equal to or greater than the reference value REF, the fourth brightness difference value DIF_LH(n+2) is compared with the reference value REF (S207).

If the third brightness difference value DIF_LH(n+1) is smaller than the reference value REF, a signal indicating that the normal image signal is a still image is output (S209a).

If, the third brightness difference value DIF_LH(n+1) is equal to or greater than the reference value REF, the fourth brightness difference value DIF_LH(n+2) is compared with the reference value REF (S208).

In the step S208, if the fourth brightness difference value DIF_LH(n+2) is smaller than the reference value REF, a signal is output indicating that the input image signal is the film image signal to which a 3:2 pull-down scheme, for example, a 60 Hz driving scheme, is applied (S209b). If the fourth brightness difference value DIF_LH(n+2) is equal to or greater than the reference value REF, the signal is output indicating the input image signal is the normal image signal (S209d).

In the step S207, if the fourth brightness difference value DIF_LH(n+2) is smaller than the reference value REF, a signal is output indicating that the input image signal is the film image signal to which a 2:2 pull-down scheme, for example, a 60 Hz driving scheme is applied (S209c). If the fourth brightness difference value DIF_LH(n+2) is equal to or greater than the reference value REF, the signal is output indicating the input image signal is the normal image signal is output (S209d).

As described above, using the brightness histogram of each frame, the input image signal may be easily discriminated as to whether the input image signal is the filmn image signal or the normal image signal.

In an exemplary embodiment, the original image signal is extracted from the film image signal, the compensation image signal is generated based on the extracted original image signal, and the original image signal and the compensation image signal are set to have a frequency higher than a frequency of the film image signal. Thus, a trembling phenomenon perceived by the viewer of the film image may be prevented, and an interruption of the displayed image, which is caused by an abrupt motion variation, may be prevented.

Although exemplary embodiments of the present invention have been described, it is understood that the present invention should not be limited to these exemplary embodiments and various changes and modifications can be made by one of ordinary skill in the art within the spirit and scope of the present invention as hereinafter claimed.

What is claimed is:

1. A method of driving a display apparatus, comprising:
receiving an image signal in response to a synchronizing signal having a first frequency;
discriminating whether the image signal is a signal corresponding to a film image or a signal corresponding to a video image;
converting the synchronizing signal into a driving signal having a second frequency higher than the first frequency;
extracting, when the image signal is discriminated to correspond to the film image, successive first, second, and third original image signals based on the film image signal;
generating a first compensation image signal based on the first original image signal and the second original image signal and generating a second compensation image signal based on the second original image signal and the third original image signal; and
sequentially outputting the first original image signal, the first compensation image signal, the second original image signal, and the second compensation image signal in response to the driving signal,
wherein the first original image signal, the first compensation image signal, the second original image signal, and the second compensation image signal are output i times, k times, j times, and k times, respectively, and
wherein the discriminating of the image signal comprises:
receiving the image signal as an n-th image signal, a previously-stored (n−1)-th image signal, and a previously-stored (n−2)-th image signal and calculating first, second, and third brightness values corresponding to the n-th image signal, the (n−1)-th image signal, and the (n−2)-th image signal, respectively;
calculating a first difference value corresponding to a difference between the first and second brightness values and a second difference value corresponding to a difference between the second and third brightness values;
calculating a third difference value corresponding to a difference between the third brightness value and a fourth brightness value corresponding to an (n+1)-th image signal and calculating a fourth difference value corresponding to a difference between the fourth brightness value and a fifth brightness value corresponding to an (n+2)-th image signal;
discriminating that the n-th image signal is the signal corresponding to the still image if the first difference value, the second difference value and the third difference value respectively, is smaller than the reference value;
discriminating that the n-th image signal is the signal corresponding to the film image if the first difference value is smaller than the reference value, the third difference value are greater than the reference value and the fourth difference value are smaller than the reference value; and
discriminating that the n-th image signal is the signal corresponding to the video image if the first difference value is greater than the reference value and the fourth difference value is greater than the reference value.

2. The method of claim 1, wherein the first frequency is 60 Hz and the second frequency is 72 Hz.

3. The method of claim 1, wherein the first compensation image signal comprises at least one sub compensation image signal to display an intermediated image between the first original image signal and the second original image signal, the second compensation image signal comprises at least one sub compensation image signal to display an intermediated image between the second original image signal and the third original image signal.

4. The method of claim 2, wherein i is 1, j is 1, and k is 2.

5. The method of claim 1, wherein the first frequency is 60 Hz, and the second frequency is 96 Hz.

6. The method of claim 5, wherein i is 1, j is 1, and k is 2.

7. The method of claim 1, wherein the first frequency is 60 Hz, and the second frequency is 120 Hz.

8. The method of claim 7, wherein the i is 3, the j is 3, and the k is 2.

9. The method of claim 7, wherein the i is 5, the j is 3, and the k is 1.

10. The method of claim 1, wherein the first compensation image signal is generated using a first motion vector generated based on the first original image signal and the second original image signal and wherein the first motion vector serves as a signal that displays intermediate images existing between a first original image corresponding to the first original image signal and a second original image corresponding to the second original image signal, and the second compensation image signal is generated using a second motion vector generated based on the second original image signal and the third original image signal and wherein the second motion vector serves as a signal that displays intermediate images existing between the second original image corresponding to the second original image signal and a third original image corresponding to the third original image signal.

11. A driving circuit for a display apparatus that receives an image signal based on a synchronizing signal having a first frequency, the driving circuit comprising:
   an image signal discriminator that discriminates whether the image signal is a signal corresponding to a film image or a signal corresponding to a video image;
   an original image signal extractor that extracts first, second, and third original image signals, which are successive, based on a film image signal if the image signal is the signal corresponding to the film image;
   an image signal converter that generates first and second compensation image signals based on the first, second, and third original image signals;
   a frequency modulator that converts the synchronizing signal into a driving signal having a second frequency higher than the first frequency; and
   a data outputter that outputs the first original image signal i times, the second original image signal j times, the first compensation image signal k times, and the second compensation image signal k times, wherein, j, and k are integers,
   wherein the image signal discriminator comprises:
   a brightness value calculator that receives the image signal as an n-th image signal, a previously-stored (n−1)-th image signal, and a previously-stored (n−2)-th image signal and calculates first, second, and third brightness values corresponding to the n-th image signal, the (n−1)-th image signal, and the (n−2)-th image signal, respectively;
   a difference calculator that calculates a first difference value corresponding to a difference between the first and second brightness values and a second difference value corresponding to a difference between the second and third brightness values; and
   a comparator that compares the first and second difference values with a predetermined reference value to discriminate whether the image signal is the signal corresponding to the film image or the signal corresponding to the video image,
   wherein the comparator compares the second difference value with the reference value if the first difference value is smaller than the reference value and discriminates that the n-th image signal is the signal corresponding to the video image if the first difference value is greater than the reference value,
   wherein the brightness value calculator further calculates a fourth brightness value corresponding to an (n+1)-th image signal and a fifth brightness value corresponding to an (n+2)-th image signal, and the difference value calculator further calculates a third difference value corresponding to a difference between the third brightness value and calculates the fourth brightness value and a fourth difference value corresponding to a difference between the fourth brightness value and the fifth brightness value,
   wherein the comparator compares the third difference value with the reference value if the second difference value is smaller than the reference value and compares the fourth difference value with the reference value if the second difference value is greater than the reference value to discriminate whether the n-th image signal is a signal corresponding to a still image or the signal corresponding to the film image, and
   wherein the comparator discriminates that the n-th image signal is the signal corresponding to the still image if the third difference value is smaller than the reference value, compares the fourth difference value with the reference value if the third difference value is greater than the reference value, discriminates that the n-th image signal is the signal corresponding to the film image if the fourth difference value is smaller than the reference value, and discriminates that the n-th image signal is the signal corresponding to the video image if the fourth difference value is greater than the reference value.

12. The driving circuit of claim 11, wherein the image signal converter generates the first compensation image signal using a first motion vector generated based on the first original image signal and the second original image signal and wherein the first motion vector serves as a signal that displays intermediate images existing between a first original image corresponding to the first original image signal and a second original image corresponding to the second original image signal, and the image signal converter generates the second compensation image signal using a second motion vector generated based on the second original image signal and the third original image signal and wherein the first motion vector serves as a signal that displays intermediate images existing between the second original image corresponding to the second original image signal and a third original image corresponding to the third original image signal.

* * * * *